United States Patent
Petit et al.

(10) Patent No.: US 9,889,530 B2
(45) Date of Patent: Feb. 13, 2018

(54) CLAMP MOUNTING SYSTEM

(71) Applicant: BTM Company LLC, Marysville, MI (US)

(72) Inventors: Brian D. Petit, Algonac, MI (US);
Andrew T. Sanders, Marysville, MI (US)

(73) Assignee: BTM Company LLC, Marysville, MI (US)

(*) Notice: Subject to any disclaimer, the term of this patent is extended or adjusted under 35 U.S.C. 154(b) by 155 days.

(21) Appl. No.: 14/851,173

(22) Filed: Sep. 11, 2015

(65) Prior Publication Data

US 2016/0008935 A1     Jan. 14, 2016

Related U.S. Application Data

(62) Division of application No. 13/654,147, filed on Oct. 17, 2012, now Pat. No. 9,156,510.

(51) Int. Cl.
| | |
|---|---|
| *B23Q 1/26* | (2006.01) |
| *B62D 65/02* | (2006.01) |
| *B62D 65/18* | (2006.01) |
| *B25B 5/00* | (2006.01) |
| *B25B 5/08* | (2006.01) |
| *B23Q 3/08* | (2006.01) |

(52) U.S. Cl.
CPC .............. *B23Q 1/26* (2013.01); *B23Q 3/08* (2013.01); *B25B 5/003* (2013.01); *B25B 5/006* (2013.01); *B25B 5/087* (2013.01); *B62D 65/026* (2013.01); *B62D 65/18* (2013.01); *Y10T 29/49826* (2015.01)

(58) Field of Classification Search
CPC ........................................................ B23Q 1/26
USPC ............................................................ 269/55
See application file for complete search history.

(56) References Cited

U.S. PATENT DOCUMENTS

| | | | |
|---|---|---|---|
| 4,667,866 A | 5/1987 | Tobita et al. | |
| 4,924,996 A | 5/1990 | Svensson et al. | |
| 5,347,700 A | 9/1994 | Tominaga et al. | |
| 5,907,489 A | 5/1999 | Elliott | |
| 6,008,471 A | 12/1999 | Alborante | |
| 6,378,855 B1* | 4/2002 | Sawdon | ............... B25B 5/064 269/32 |
| 6,502,880 B1 | 1/2003 | Sawdon | |

(Continued)

FOREIGN PATENT DOCUMENTS

| | | |
|---|---|---|
| EP | 1837120 B1 | 7/2008 |
| JP | 05277848 A | 10/1993 |

(Continued)

OTHER PUBLICATIONS

Drawing of prior riser, bracket and clamp assembly (believed to have been publicly used in U.S. prior to Oct. 2011).

(Continued)

*Primary Examiner* — Lee D Wilson
(74) *Attorney, Agent, or Firm* — Harness, Dickey & Pierce, P.L.C.

(57) ABSTRACT

A single mounting device is provided for each trolley riser for use with a set of shims in order to accurately align and secure a clamp to a datum. In another aspect, a generally polyhedron-shaped clamp body is used with a mounting plate to secure a clamp in different orientations relative to a manufacturing plant locator.

20 Claims, 12 Drawing Sheets

(56) References Cited

U.S. PATENT DOCUMENTS

| | | | |
|---|---|---|---|
| 6,687,971 B2 | 2/2004 | Nakamura | |
| 6,695,359 B2 * | 2/2004 | Morel | B23B 31/185 |
| | | | 269/244 |
| 6,698,736 B2 | 3/2004 | Dugas et al. | |
| 6,902,159 B2 | 6/2005 | Sawdon et al. | |
| 7,029,000 B2 | 4/2006 | Petit et al. | |
| 7,156,385 B2 | 1/2007 | Mulder | |
| 7,188,832 B2 | 3/2007 | Kita et al. | |
| 7,370,856 B2 | 5/2008 | Sawdon et al. | |
| 7,469,473 B2 | 12/2008 | Savoy | |
| 7,516,948 B2 * | 4/2009 | McIntosh | B25B 5/062 |
| | | | 269/27 |
| 7,686,286 B2 | 3/2010 | Colby | |
| 7,815,176 B2 * | 10/2010 | McIntosh | B25B 5/087 |
| | | | 269/229 |
| 8,001,673 B2 | 8/2011 | Hur | |
| 8,366,090 B2 | 2/2013 | Yonezawa et al. | |
| 9,156,510 B2 * | 10/2015 | Petit | B62D 65/18 |
| 2002/0093131 A1 * | 7/2002 | Dugas | B25B 5/16 |
| | | | 269/32 |
| 2004/0239023 A1 | 12/2004 | Sawdon et al. | |
| 2005/0121843 A1 * | 6/2005 | Maffeis | B25B 5/122 |
| | | | 269/32 |
| 2006/0049565 A1 * | 3/2006 | Petit | B25B 5/087 |
| | | | 269/32 |
| 2007/0045362 A1 * | 3/2007 | Colby | B25B 5/087 |
| | | | 224/101 |
| 2008/0229559 A1 * | 9/2008 | Miyashita | B23K 37/0435 |
| | | | 24/528 |
| 2009/0121403 A1 * | 5/2009 | McIntosh | B25B 5/062 |
| | | | 269/32 |
| 2009/0184451 A1 * | 7/2009 | Hiromatsu | B25B 5/087 |
| | | | 269/238 |
| 2009/0289043 A1 | 11/2009 | Kilibarda | |
| 2011/0291341 A1 * | 12/2011 | Sawdon | B25B 5/062 |
| | | | 269/216 |
| 2012/0030924 A1 | 2/2012 | Kilibarda et al. | |
| 2012/0145514 A1 | 6/2012 | Magni et al. | |
| 2013/0320607 A1 | 12/2013 | Kaji et al. | |

FOREIGN PATENT DOCUMENTS

| | | |
|---|---|---|
| JP | 2003145363 A | 5/2003 |
| KR | 20040082843 A | 9/2004 |
| RU | 2219034 C1 | 12/2003 |

OTHER PUBLICATIONS

BTM Catalogue—Pneumatic Pin & Finger Clamps 732796DB (published prior to Oct. 2012).

BTM Catalogue—User Guide: Pin Locator Clamps 732868AB (published prior to Oct. 2012).

Volvo Car Corporation Drawing Nos. 09928905 and 09928906 "Shimbox Mikro 75x75" and "Base Plate Mikro 75x75"; and Standard BCD 7153, 3 pp. 1-6 (believed to have been commercially used in Europe prior to Sep. 2015).

* cited by examiner

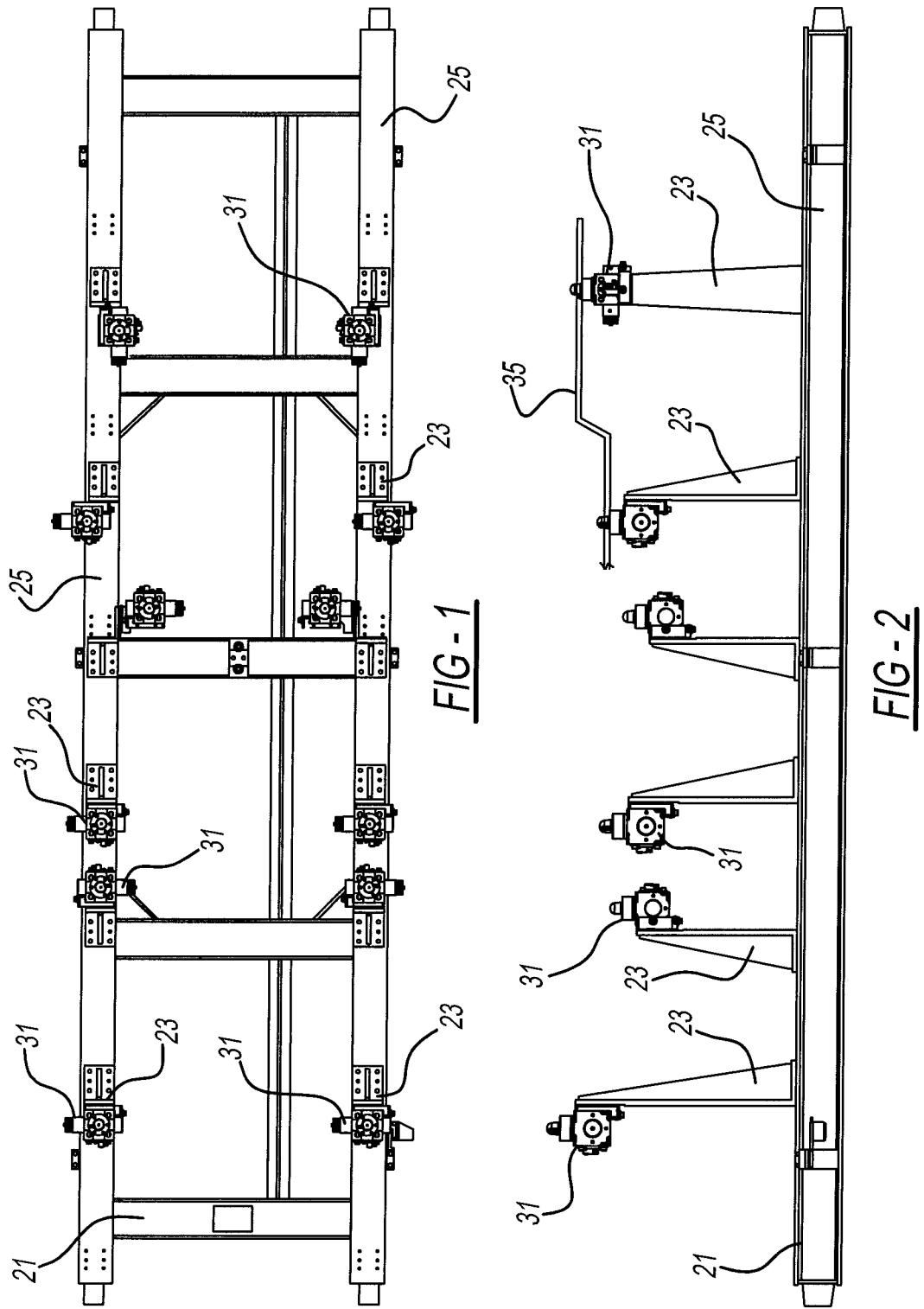

CLAMP MOUNTING SYSTEM

CROSS-REFERENCE TO RELATED APPLICATIONS

This application is a divisional of U.S. patent application Ser. No. 13/654,147 filed on Oct. 17, 2012. The entire disclosure of the above application is incorporated by reference herein.

BACKGROUND AND SUMMARY

The invention generally pertains to a workpiece retaining clamp and more particularly to a clamp mounting system.

Various locking pin clamps have been used for vehicular assembly. Exemplary conventional constructions are disclosed in the following U.S. Pat. No. 8,001,673 entitled "Clamping Device for Vehicle Body Transfer Cart" which issued to Hur on Aug. 23, 2011; U.S. Pat. No. 7,469,473 entitled "Assembly Line Vehicle Body Positioning" which issued to Savoy on Dec. 30, 2008; and U.S. Pat. No. 6,687,971 entitled "Vehicle Body Transfer Machine and Method Thereof" which issued to Nakamura on Feb. 10, 2004. Another tradition example is disclosed in U.S. Patent Publication No. 2012/0030924 entitled "Vehicular Body Assembly Locking Apparatus and Method" which published to Kilibarda et al. on Feb. 9, 2012. These patents and application are all incorporated by reference herein. Conventional mounting and alignment of such clamps is time consuming and expensive. For example, many additional mounting brackets and fasteners are employed to orient conventional clamps relative to risers, pillars or locators. Furthermore, these traditional clamps are often difficult to place in differing orientations relative to the riser. Since many pin clamps are used on each assembly plant trolley or moving pallet, these extra mounting brackets collectively add considerable weight, part cost and set up time.

In accordance with the present invention, a single mounting device is provided for each trolley riser for use with a set of shims in order to accurately align and secure a clamp to a datum. In another aspect, a generally polyhedron-shaped clamp body is used with a mounting plate to secure a clamp in different orientations relative to a manufacturing plant locator. Still another aspect provides a blade extension and mounting plate attachment between a cylindrically shaped clamp housing and a datum. A reconfigurable extension kit is also employed with a pin clamp. Moreover, a method of assembling a clamp to a trolley is disclosed.

The present clamp mounting system is advantageous over conventional approaches since the present system does not require additional mounting brackets. Furthermore, the single mounting plate per structural riser allows for side or bottom mounting along vertical or horizontal datum surfaces. Additionally, the present system advantageously tightly fastens the clamp assembly against the mounting plate side walls with a single diagonal fastener, with optional shims in between. The generally symmetrical design of the clamp body allows for different clamp orientations relative to the mounting plate and structural datum, which provides for greater locational flexibility and reduced obstruction for optical sensing and workpieces during clamp alignment and clamping usage. Moreover, the present clamp mounting system reduces part costs, part weight and assembly time. Additional advantages and features of the present invention can be ascertained from the following description and claims as well as the appended drawings.

BRIEF DESCRIPTION OF THE DRAWINGS

FIG. 1 is a top elevational view showing an assembly plant trolley including multiples of a clamp mounting system;

FIG. 2 is a side elevational view showing the assembly plant trolley including multiples of the clamp mounting system;

FIG. 14 is a perspective view showing a second embodiment clamp mounting system;

DETAILED DESCRIPTION

Figure 3:
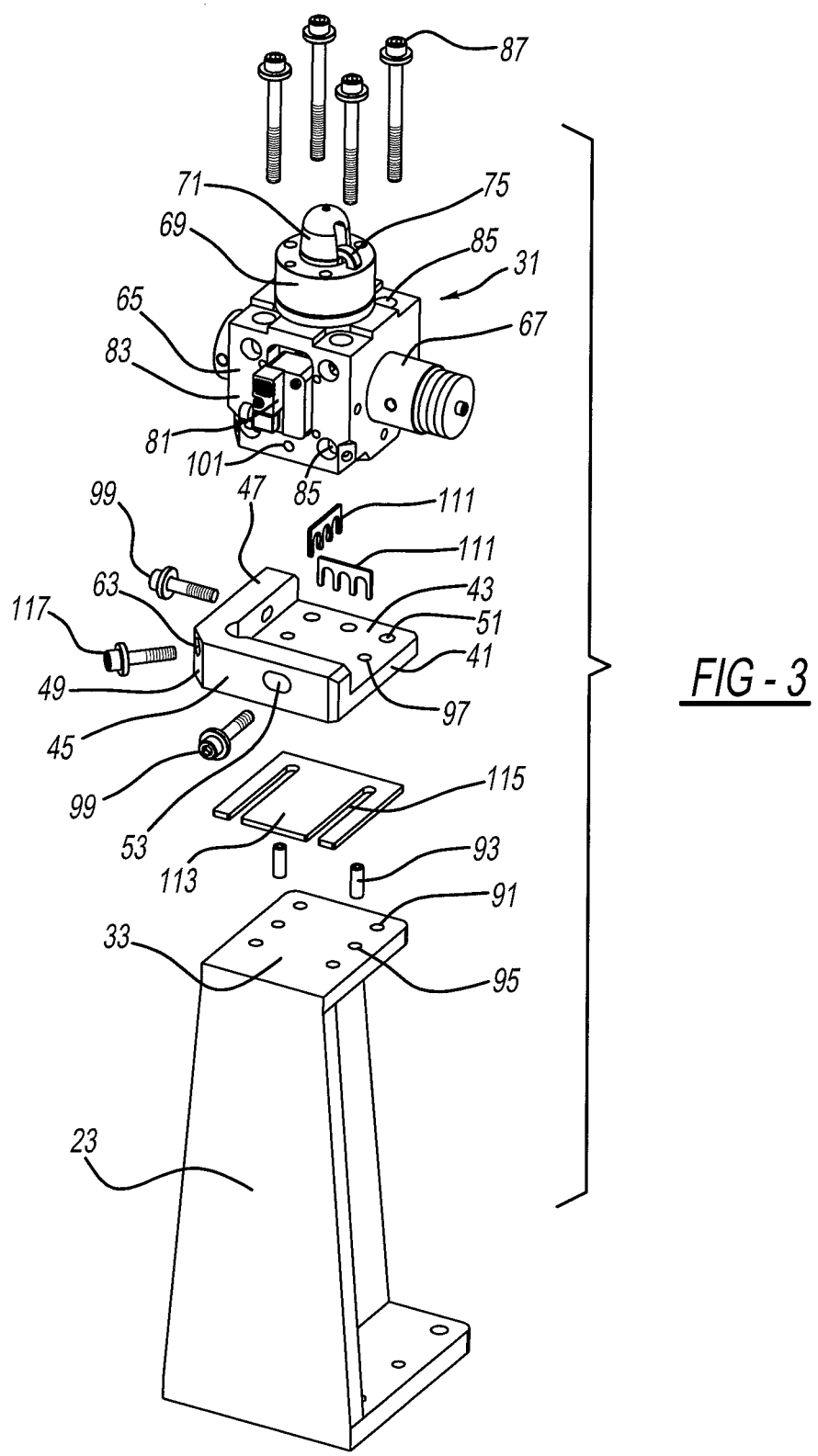
FIG. 3 is an exploded perspective view showing a first embodiment of the clamp mounting system.
Figure 4:
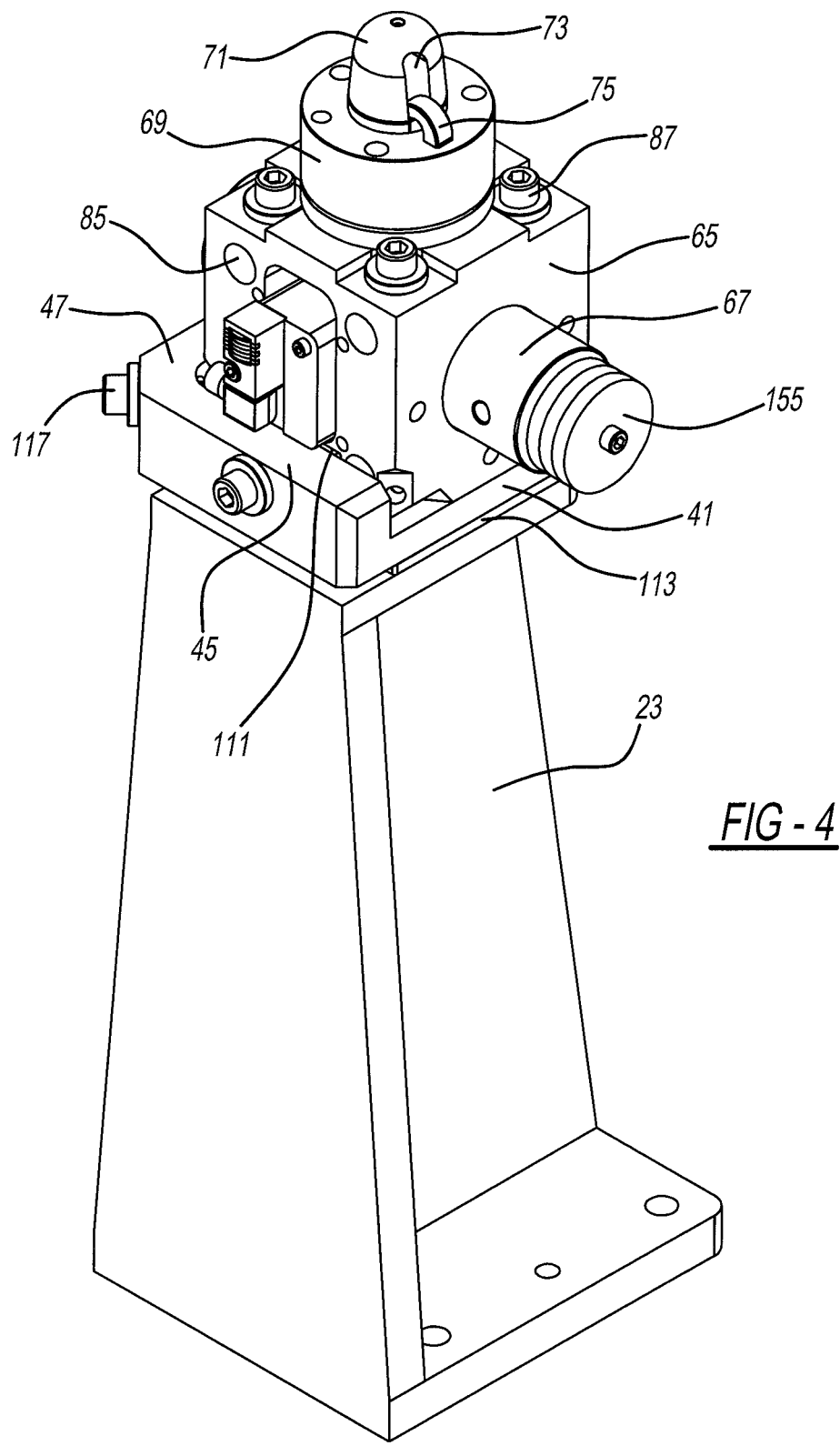
FIG. 4 is a perspective view showing the first embodiment clamp mounting system.
Figure 5:
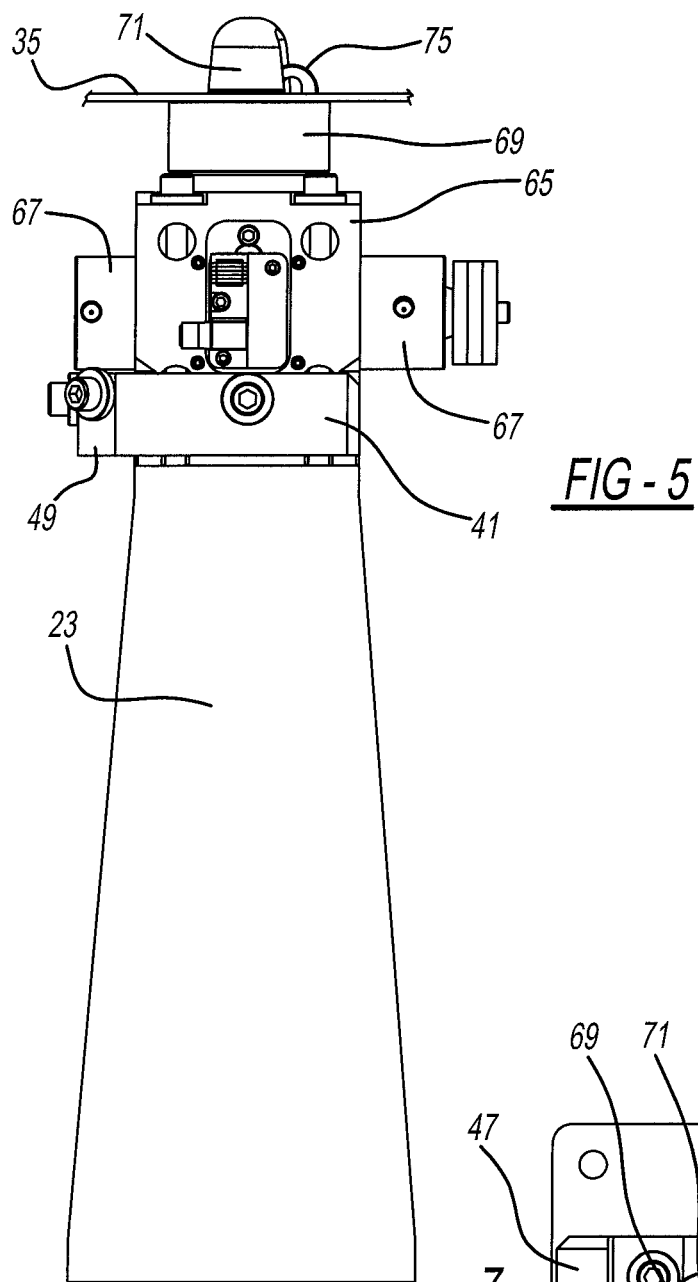
FIG. 5 is a side elevational view showing the first embodiment clamp mounting system.
Figure 6:
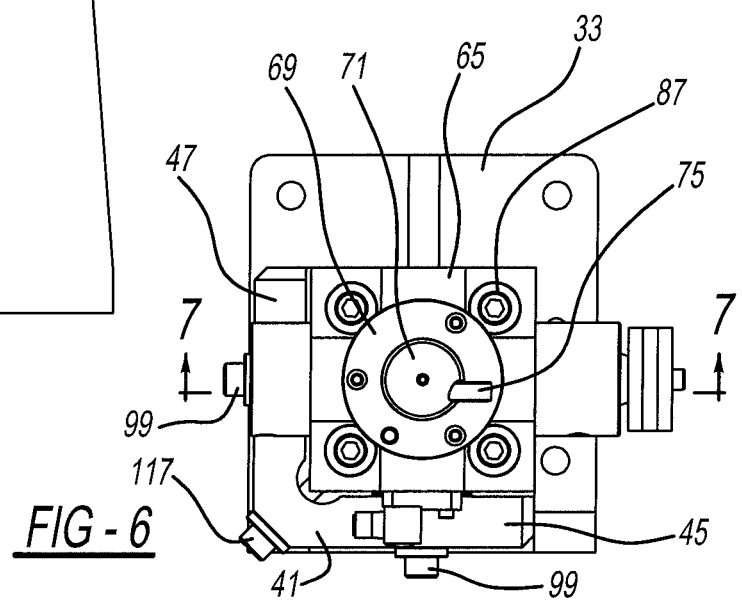
FIG. 6 is a top elevational view showing the first embodiment clamp mounting system.
Figure 8:
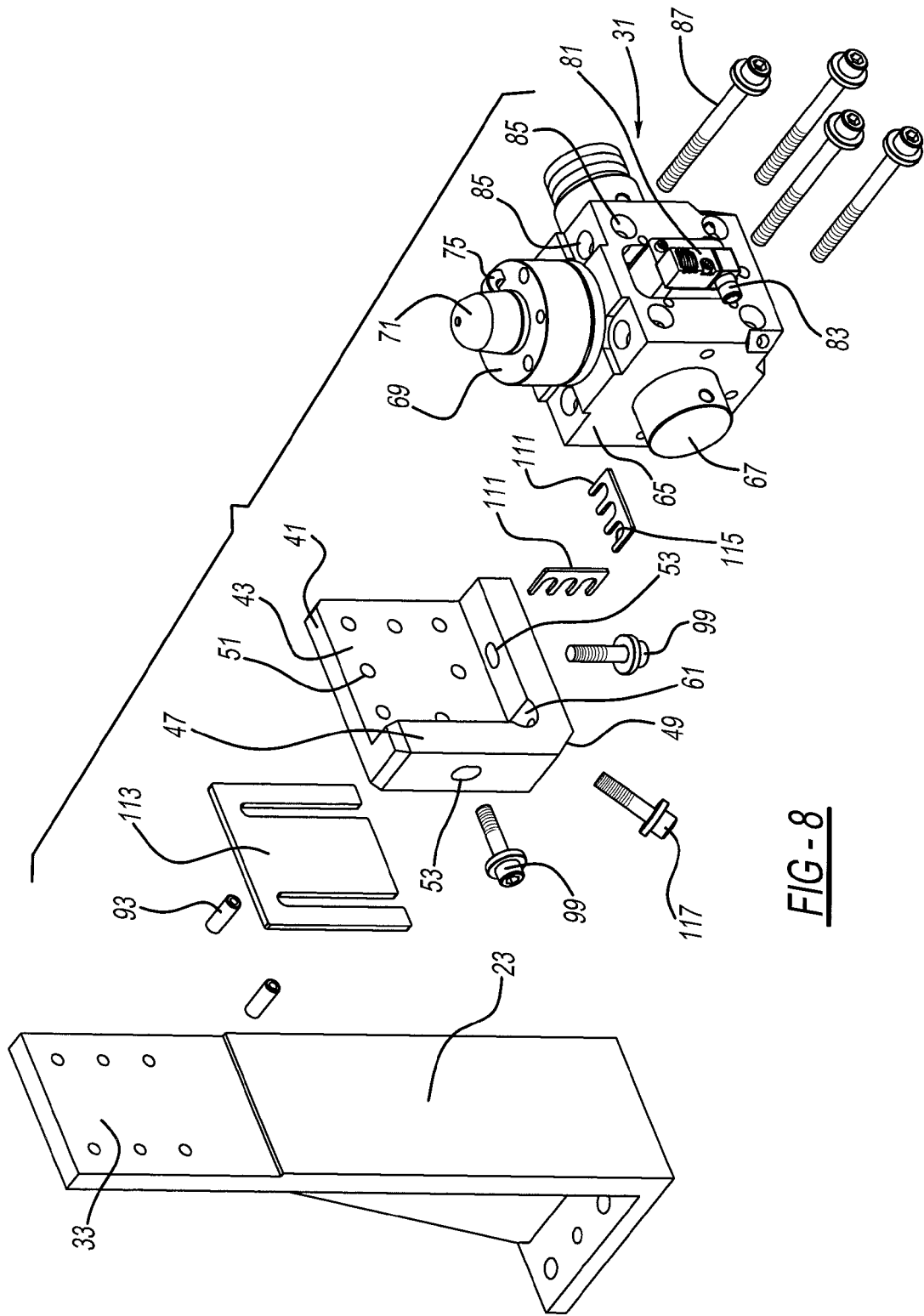
FIG. 8 is an exploded perspective view showing the first embodiment clamp mounting system in a different orientation.

Referring to FIGS. 1, 2, 3 and 8 a trolley 21, also known as a conveyor cart or pallet, is attached to and automatically moves along an assembly line in an automotive vehicle assembly plant. A plurality of upstanding structural risers, pillars or locators 23 are fixed to underlying horizontal beams 25 of each trolley 21. A mounting system attaches each pin clamp assembly 31 to a datum surface 33 of each riser 23. Each pin clamp serves to align and temporarily secure sheet metal automotive vehicle panels or workpieces 35 for movement with each trolley 21 as it moves from a loading station, to a welding or riveting station, and then to an unloading station. Risers 23 are illustrated as having either a horizontal datum surface, as shown in FIG. 3, or having a vertical datum surface, as shown in FIG. 8, however, diagonally angled or other orientations may be alternately provided for this datum surface which acts as a reference plane for alignment and mounting of pin clamp assembly 31.

Reference should now be made to FIGS. 3-6, which illustrate pin clamp assembly 31 mounted to horizontally oriented datum surface 33 of riser 23. An aluminum mounting plate 41 includes a generally flat base 43 bordered by a pair of upstanding and generally perpendicularly projecting side walls 45 and 47, which intersect at a corner 49. A set of holes 51 extend through base 43 and an elongated slot 53 extends through each side wall 45 and 47. A semicircular clearance cavity 61 is internally located opposite corner 49 and a through-hole 63 extends between corner 49 and clearance cavity 61.

Pin clamp 31 includes a generally polyhedron shaped, more preferably substantially cube-shaped, body 65 to which is attached a piston cylinder 67 extending outwardly therefrom. Body 65 is a machined aluminum block with internal bores. A cylindrical clamping collar or donut 69 is mounted to an external surface of body 65 and a tapered locating pin 71 is mounted to a distal end of clamping collar 69. Pin 71 is narrower than collar 69. Moreover, a slot 73 is located in a side of locating pin 71 and is accessible to a hollow central passageway extending through locating pin 71, collar 69 and body 65. This allows movement of a clamping finger 75 between an internally retracted unclamping position (see FIG. 7B) and externally extending clamping position (see FIGS. 5 and 7A).

A switch pack 81 and pneumatic fluid supply line fitting 83 also project from a surface of body 65. When the trolleys 21 are moved between stations, the pneumatic air and any electrical connection lines are detached, yet the internal clamping mechanism is designed to maintain a clamping position until the trolley is moved to the unloading station wherein the pneumatic and any electrical lines are reconnected and the clamps are released to allow workpiece unloading.

Four or more oversized and unthreaded holes 85 extend through opposed major external faces of body 65 within which smaller diameter shafts of threaded wall fasteners 87 extend. Threaded distal end segments of each bolt 87 are received within associated internally threaded holes 91 on datum surface 33 of riser 23, while trapping mounting plate 41 therebetween. Bolts 87 are initially set in a loose condition until alignment is completed. Locator dowel pins 93 snuggly fit within middle holes 95 of datum surface 33 and middle holes 97 in mounting plate 41. Furthermore, threaded bolt retention fasteners 99 adjustably extend through corresponding unthreaded and oversized slots 53 in side walls 45 and 47 of mounting plate 41 and threaded end segments of bolts 99 engage within intermediate threaded holes 101 of clamp body 65. Thus, fasteners 87 and 99 allow clamp assembly 31 to be loosely secured within mounting plate 41 at this initial assembly stage and are only tightened after alignment is completed.

Comb-like shims or spacers 111 are inserted between offset surfaces of clamp body 65 and the corresponding internal surfaces of side walls 45 and 47 of mounting plate 41 based on optical (e.g., camera or laser) x and y-axis setup alignment of clamp assembly 31 relative to datum surface 33. Additionally, a z-axis shim or spacer 113 is inserted in a parallel direction between the major surface of base 43 and datum surface 33. Elongated, spaced apart, parallel and openly accessible slots 115 in each shim 111 and 113 allow for shims to be inserted after the fasteners 99 and pins 93 are in place; in other words, the slots 115 can be slid around the fasteners and pin. Shims 111 and 113 are selected from a standard package of differing thickness NAAMS shims. Thus, if the optical alignment system indicates that the clamp body needs to be 0.5 mm further away from a side wall of the mounting plate then a corresponding 0.5 mm shim can be selected and inserted therein before a draw fastening bolt 117 diagonally snugs clamp body 65 against side walls 45 and 47. Similarly, if the alignment system determines that clamp assembly 31 needs to be positioned 1.0 mm further away from datum surface 33, then the technician will select a correspondingly thick shim 113 and insert same between base 43 and surface 33 prior to complete tightening of clamp body against mounting plate 41.

Figure 9:
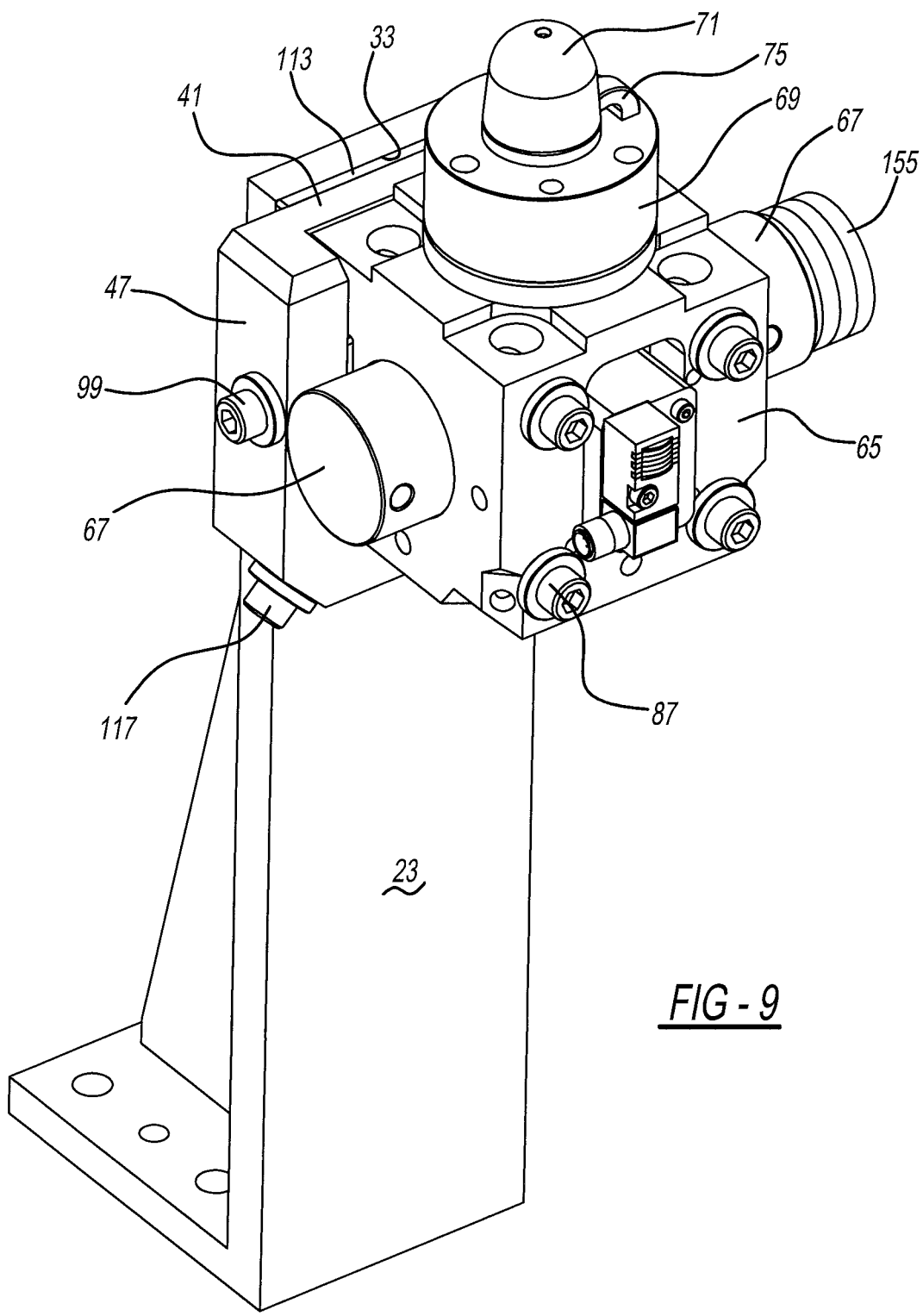
FIG. 9 is a perspective view showing the first embodiment clamp mounting system in the different orientation.
Figure 10:
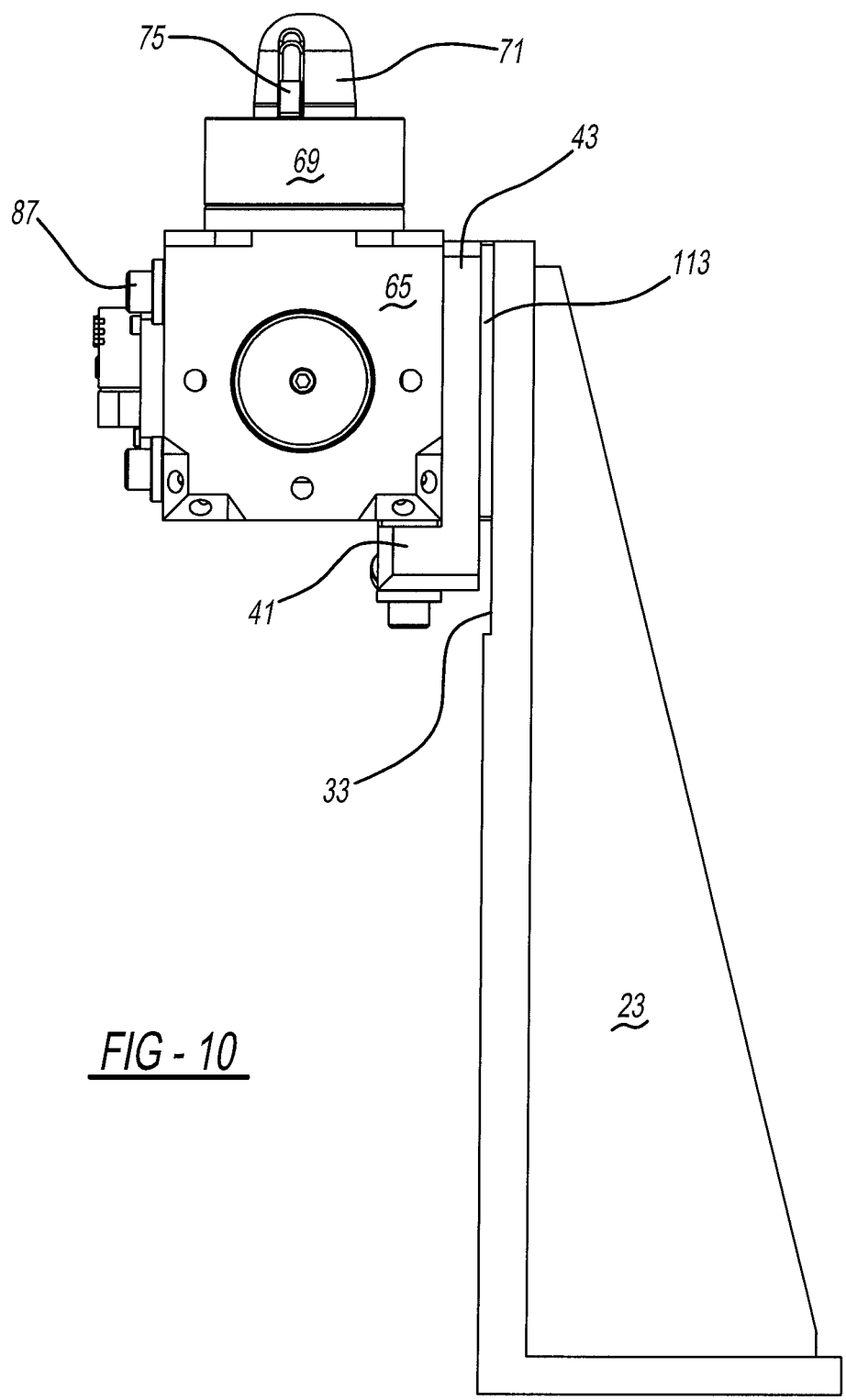
FIG. 10 is an elevational view showing the first embodiment clamp mounting system in the different orientation.
Figure 11:
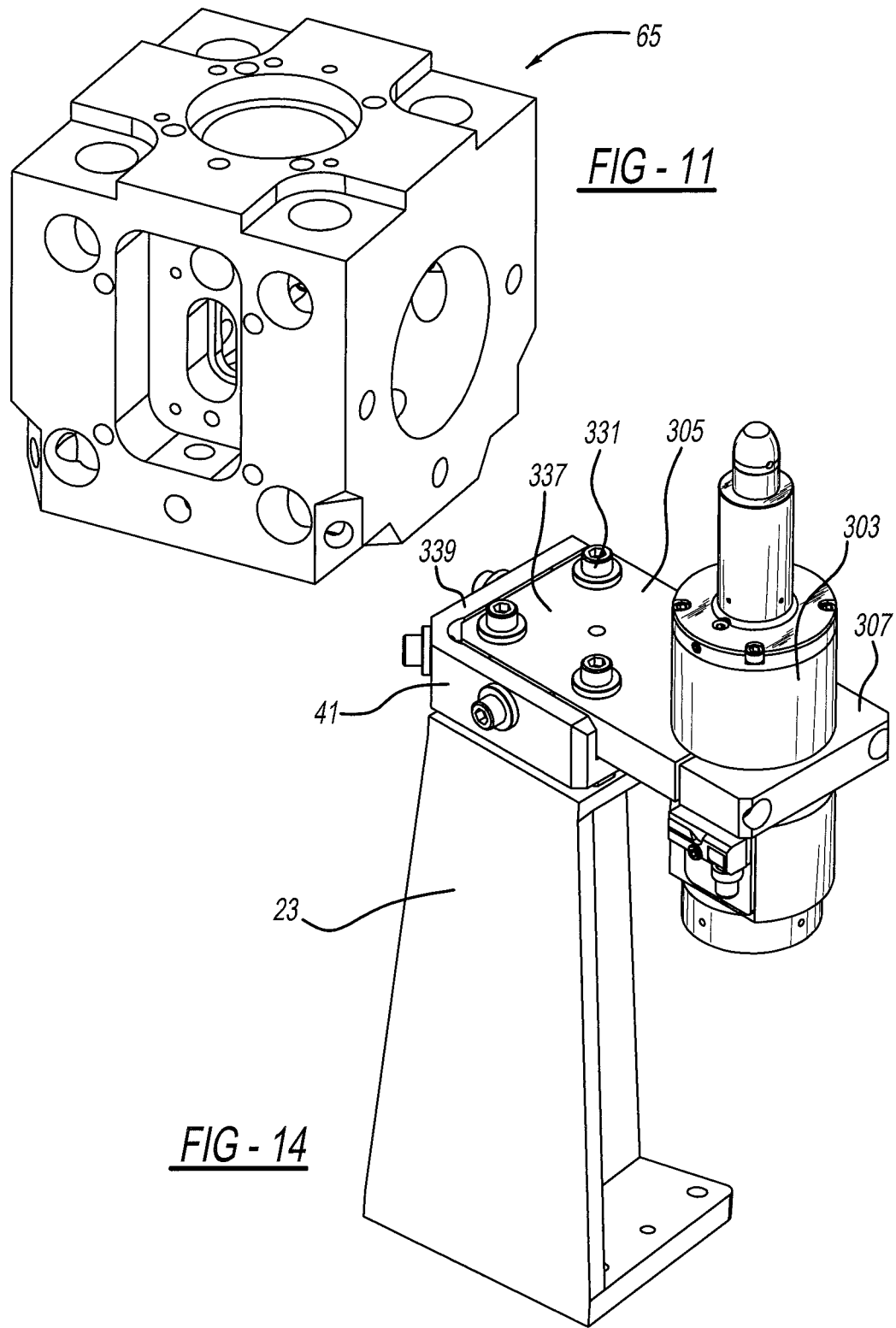
FIG. 11 is a perspective view showing a clamp body of the first embodiment clamp mounting system.

A similar arrangement is employed for the vertically oriented datum surface 33 and clamp assembly 31 shown in FIGS. 8-10. In this configuration, however, the generally cube-shaped configuration of clamp body 65 allows it to be mounted on a different side than that for the horizontal datum surface mounting of FIG. 3. It is noteworthy that only a single mount 41 and set of shims are needed in order to precisely align and secure a clamp to a structural datum member, thereby avoiding the extra expense, weight and setup time required for conventional supplemental bracketry and fasteners.

Figure 7:
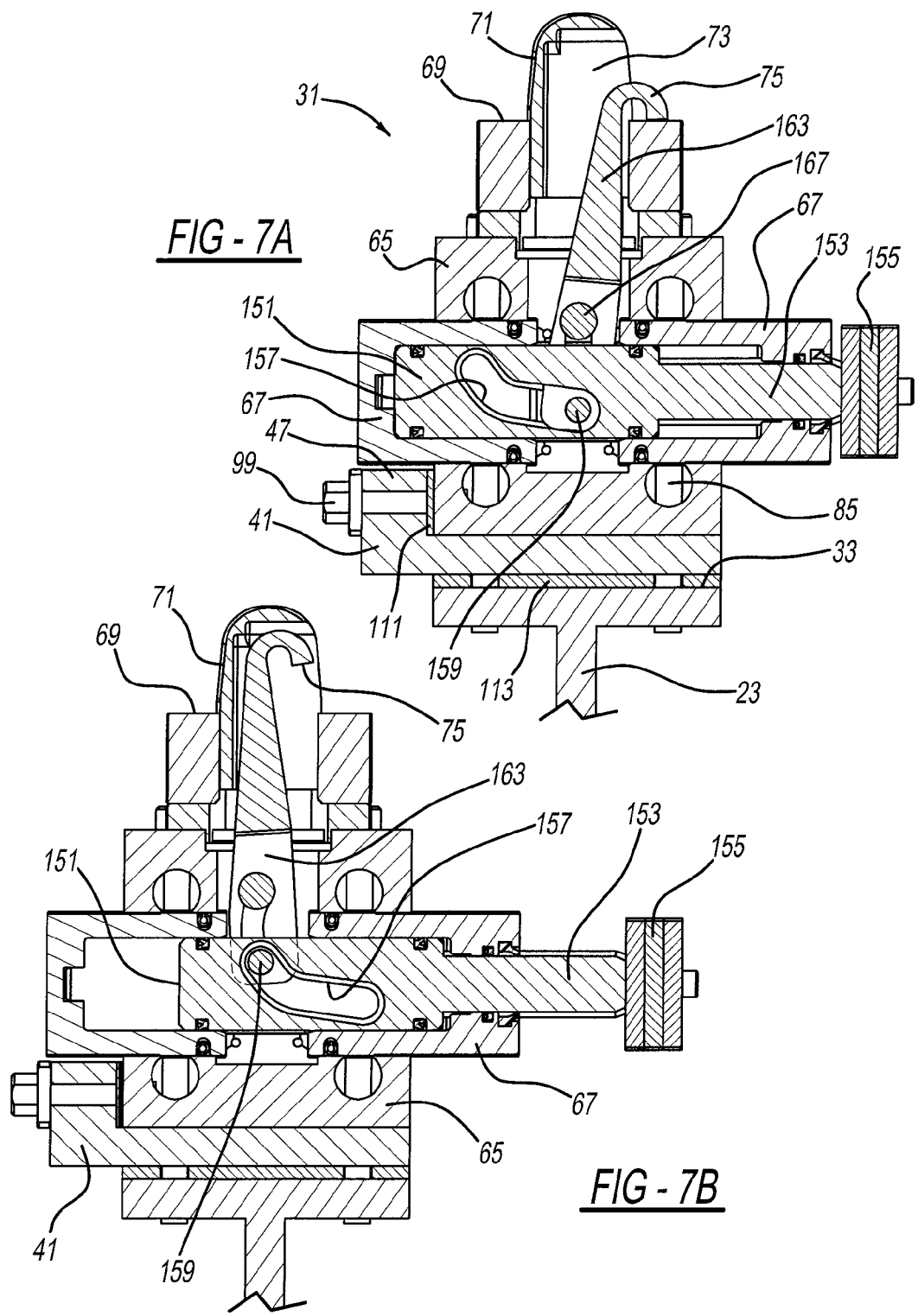
FIGS. 7A and 7B are cross-sectional views, taken along line 7-7 of FIG. 6, showing different positions of a clamp used in the first embodiment clamp mounting system.
Figure 12:
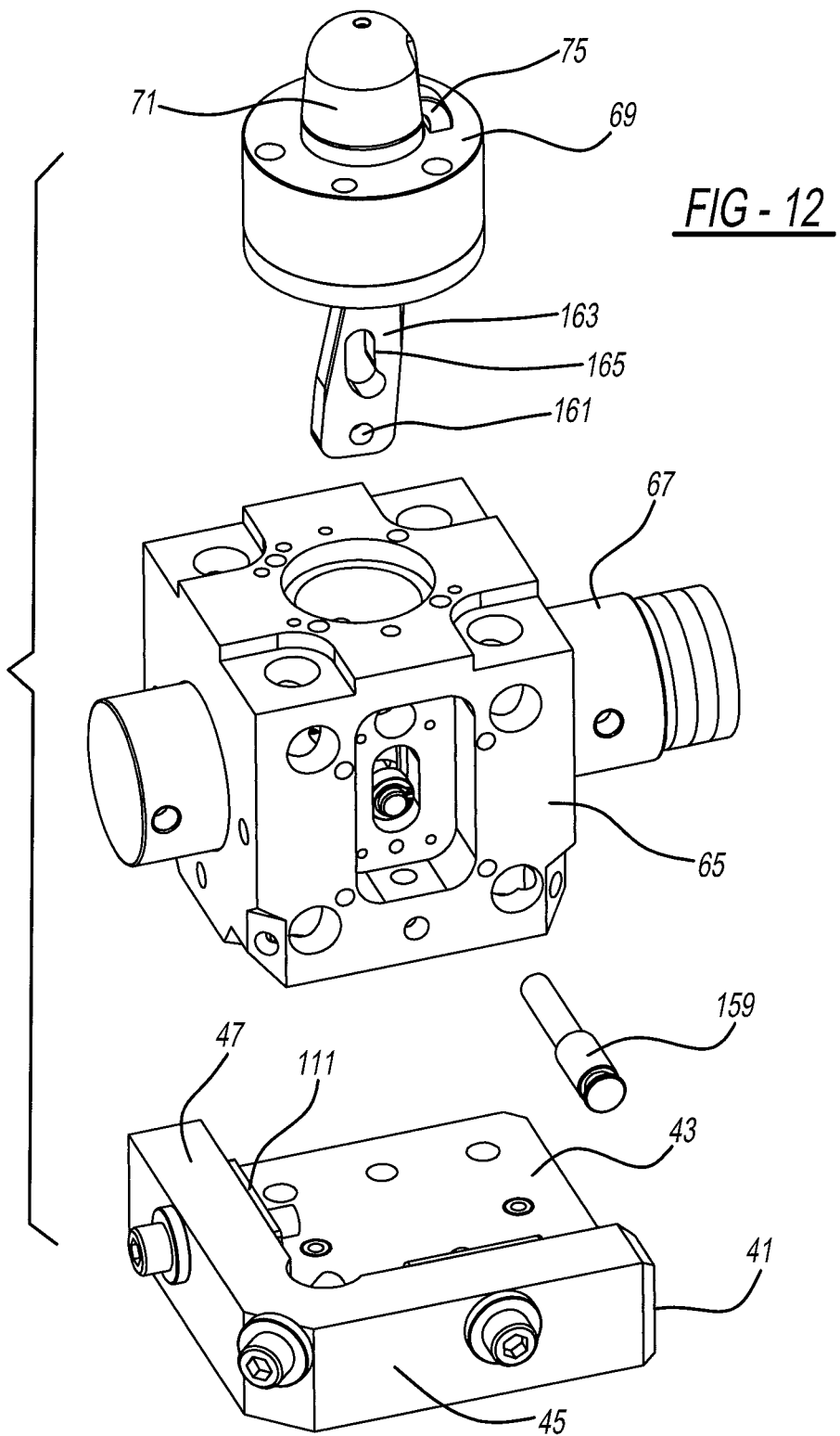
FIG. 12 is a partially exploded perspective view showing the first embodiment clamp mounting system.

The internal construction and operation of pin clamp assembly 31 can best be viewed in FIGS. 7A, 7B and 12. A pneumatically driven actuator piston 151 linearly advances or retracts within cylinder 67, primarily inside of body 65. A piston rod 153 coaxially projects from piston 151 and carries alternating black and white discs 155 on an external end thereof which are optically monitored by a camera or the like to determine actuation position.

An offset angled camming slot 157 is internally disposed within piston 151, or alternately rod 153, within which is a cam follower pin 159. Cam follower pin 159 is also attached to an aperture 161 at a distal end of a longitudinally elongated shaft 163, at an opposite end of which is located clamping finger 75. A middle section of shaft 163 includes an offset angled camming slot or surface 165 within which rides another cam follower 167 attached to an inside of body 65. Thus, when piston 151 is moved, it will in turn, cause clamping finger 75 to move from an unclamped position to a clamped position, and vice versa. Such an arrangement is disclosed is U.S. Pat. No. 6,378,855 entitled "Locking Pin Clamp" which issued to Sawdon et al. on Apr. 30, 2002, and is incorporated by reference herein.

Figure 13:
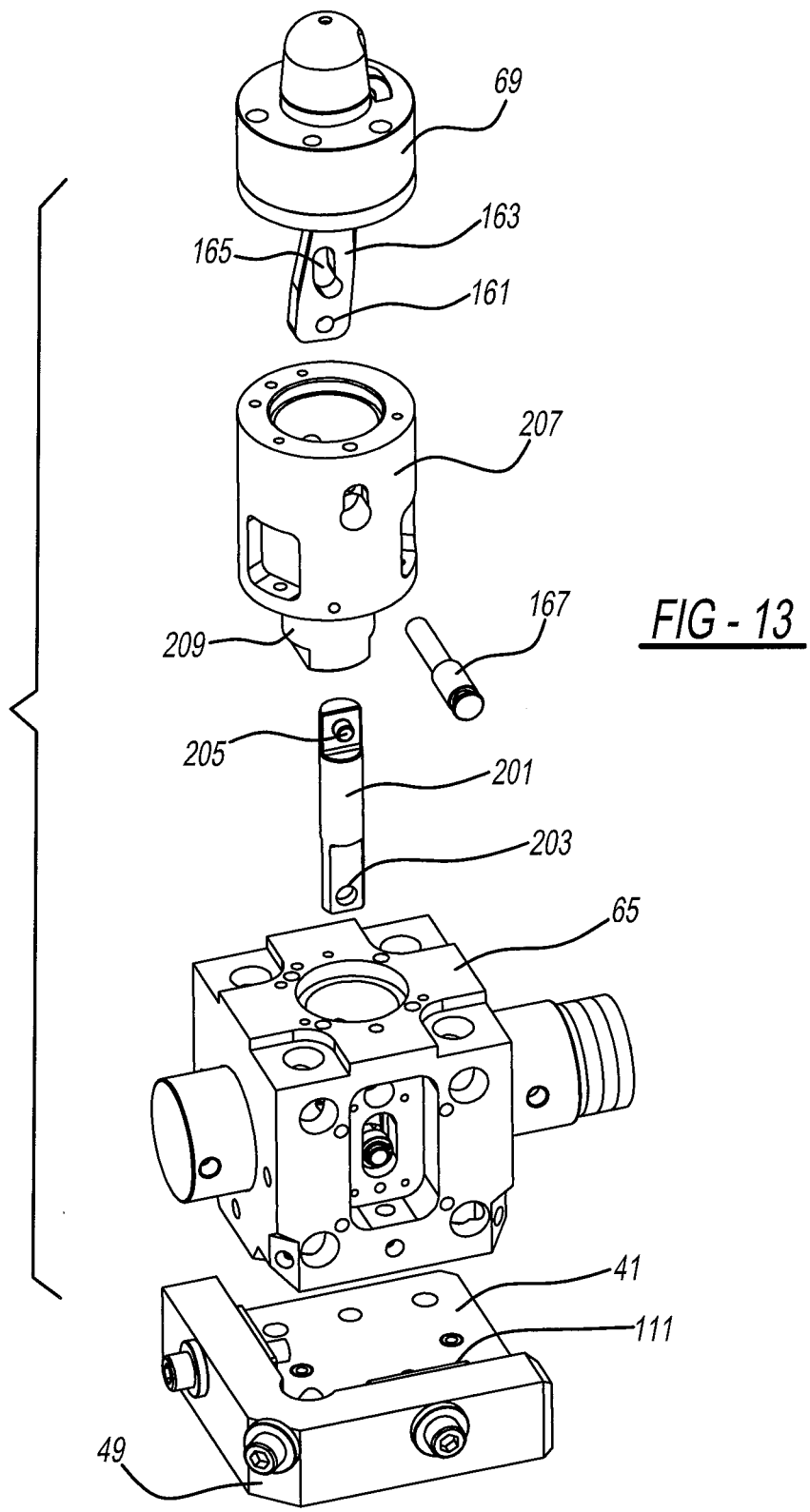
FIG. 13 is a partially exploded perspective view showing an extension kit optionally employed with the first embodiment clamp mounting system.

FIG. 13 shows an optional expansion kit for use when a longer distance is desired between the clamping location and the clamp body. It is used to reconfigure an existing clamp. Prior clamp constructions, such as those disclosed in U.S. Pat. No. 7,516,948 to McIntosh and U.S. Pat. No. 6,698,736 to Dugas, use shims 74 and spacers 45A and 70, respectively, in a crude attempt to retrofit existing designs. In contrast, however, the present expansion kit is especially designed in a refined manner so as to be more accurate, easily attachable and durable during repeated use in a dirty manufacturing plant environment. In the present construction, an extension rod 201 has a bore 203 at a first end for receiving cam follower 159 and has a pin 205 laterally projecting at an opposite second end for attachment to a bore 161 of clamping number 163. A circular-cylindrical extension housing 207 is bolted on top of housing 65 and clamping collar 69 is bolted on top of an end of extension housing 207. Cam follower pin 167 laterally extends through extension housing 207 for engagement with camming slot 165 while clamping number 163. Extension housing 207 additionally includes a hollow neck section 209 for guiding extension rod 201. Depending on the extra distance desired, this extension kit allows for an extra clamp-to-body distance greater than 10 mm, and more preferably at least 25 mm, which would be unsuitable for prior spacers.

Figure 15:
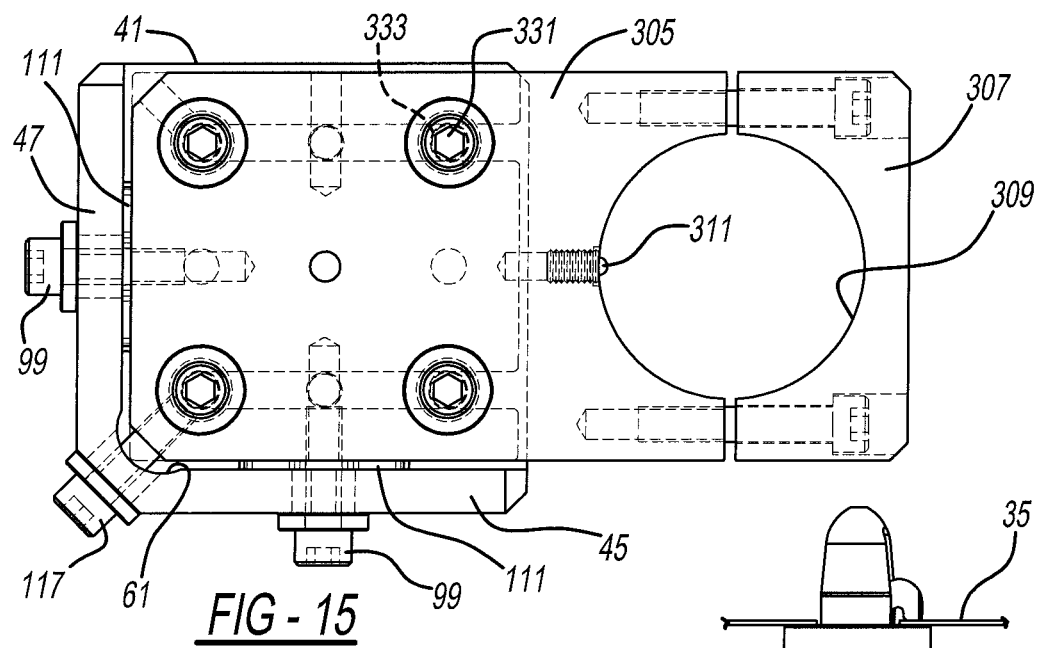
FIG. 15 is a top elevational view showing the second embodiment clamp mounting system.
Figure 16:
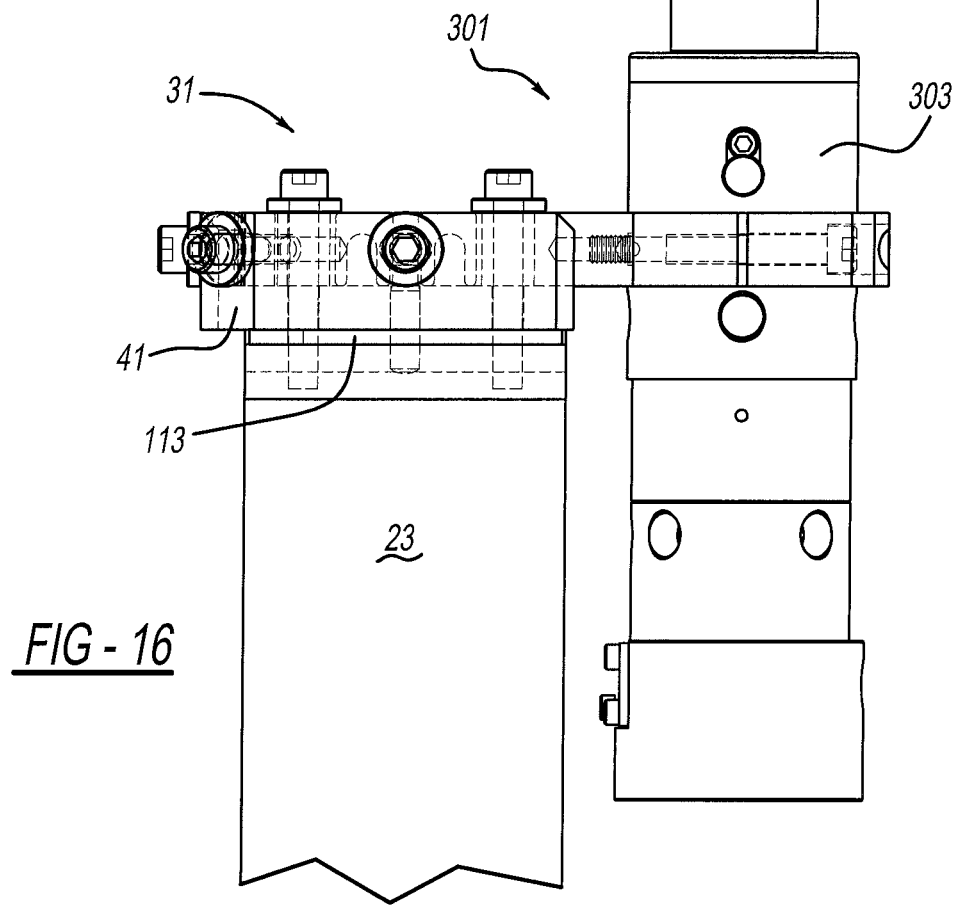
FIG. 16 is a side elevational view showing the second embodiment clamp mounting system.

Reference should now be made to FIGS. 14-16. In this second clamp assembly configuration, the same mounting plate 41, riser 23, and shims 111 and 115 are employed as with the prior embodiment. They are used, however, with a differently shaped clamp assembly 301. The automatically actuated, locating pin clamp is of the type disclosed in U.S. Patent Publication No. 2011/0291341 entitled "Pin Clamp" which published to Edwin Sawdon et al. on Dec. 1, 2011, which is incorporated by reference herein. Of note, this locating pin clamp has a circular-cylindrical housing 303 which is retained by a removable blade extension 305 and bolted on end cap 307 which internally define a generally circular collar or cavity 309 therebetween. Extension 305 and cap 307 define a generally rectangular-polyhedron peripheral shape and a finger 311 projects within cavity 309 for further securing housing 303 therein. For purposes of this application, extension 305, cap 307 and housing 303 are all considered to be the clamp body. Bolts 331 extend through unthreaded and oversized holes 333 in extension 305 to initially loosely secure extension 305 to a base of mounting plate 41. Thereafter, shims 111 are inserted between upstanding side walls 45 and 47, and the adjacent flat surfaces of extension 305, whereafter draw bolt faster 117 snugly tightens extension 305 against the mounting plate side walls. Shim 115 is also inserted between mounting plate 41 and the datum surface of riser 23, if needed, prior to complete tightening of bolts 331. In the fully tightened condition, the major flat exposed surface 337 of extension 305 is generally flush or slightly below flush with an upper edge 339 of upstanding walls 45 and 47. This generally flush configuration provides extra sheet metal workpiece 35 clearance and optical sensing clearance to the clamping area without unnecessary obstruction.

While various configurations of the present clamp mounting system have been disclosed, it should be appreciated that other variations may be employed. For example, while three shims have been disclosed, in practice, only one or two shims may actually be needed depending on the sensed alignment situation presented. Conversely, two or more shims may be stacked upon each other if extra space is required. Furthermore, while threaded bolts have been shown for retention, it is envisioned that other fasteners that perform the same function can ultimately be used, although some advantage may not be realized. Moreover, while a structural riser and trolley have been shown, other assembly plant fixtures having a stationary mounting and/or datum orientation surface can be substituted therefore, although certain advantages of the present system may not be achieved. It is also envisioned that other clamp constructions can be used with the present mounting system although certain advantages may not be realized. For example, an electromagnetically actuated or even manually lever actuated clamps can be used with the present mounting system, but the many benefits of the automated pneumatic clamp and locating pin construction disclosed herein may be forfeit. It is alternately envisioned that shim 113 can be inserted between base 43 of mounting plate 41 and clamp body 65 or 305.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. It is intended by the following claims to cover these and any other departures from the disclosed embodiments which fall within the true spirit of this invention.

The invention claimed is:

1. A reconfigurable clamp system comprising:
 a body;
 an automatically powered actuator at least partially movable within the body;
 a clamping collar externally coupled to the body;
 a locating pin mounted to a distal end of the clamping collar in a coaxial direction;
 a clamping finger movable in response to movement of the actuator and clamping against a surface of the clamping collar when in a clamping condition; and
 an extension kit comprising a hollow extension collar at least 10 mm long in the coaxial direction, and an elongated extension rod located within the extension collar for spacing away the locating pin, clamping finger and clamping collar a greater distance from the body and actuator, the extension collar and rod being removable.

2. The system of claim 1, wherein the actuator includes a pneumatically powered piston and the clamping finger has a hook-shaped end and a cam.

3. The system of claim 1, further comprising:
 a pneumatically driven piston;
 the clamping finger movable from a retracted to a clamping position in response to movement of the piston; and
 the locating pin having a substantially tapered shape.

4. The system of claim 3, wherein:
 the elongated extension rod couples the piston to the clamping finger;
 the hollow extension collar is removably attached to the body; and
 the piston advances and retracts substantially perpendicular to a receiving direction of the locating pin and an elongated direction of the extension rod.

5. The system of claim 1, further comprising:
 a structural member having a datum surface;
 a mount removably attachable to the structural member, the mount including a base, a substantially perpendicular first side wall and at least a substantially perpendicular second side wall;
 the clamp body being removably attachable to the mount;
 at least one shim insertable between at least one of: (a) the base of the mount and the datum of the structural member, (b) the first side wall of the mount and the clamp body, or (c) the second side wall of the mount and the clamp body; and
 a fastener extending through a hole at an intersection of the side walls of the mount and engaging the clamp body, tightening of the fastener pulling the clamp body against the side walls of the mount or the shims if located therebetween.

6. The system of claim 5, wherein the clamp body has a substantially polyhedron shape with six major external surfaces, holes extending through at least four of the surfaces for allowing at least two of the major surfaces to be positioned against the walls of the mount, further comprising elongated fasteners extending through the holes in the body.

7. The system of claim 1, further comprising:
 a right-angle riser mounted to a moving assembly line trolley;
 the clamp body being mounted to the riser; and
 the clamping finger operably securing an automotive vehicle panel.

8. A clamp system comprising:
 a clamp body;
 an automatically powered actuator at least partially movable within the body;
 a clamping collar externally coupled to the body;

a locating pin mounted to a distal end of the clamping collar in a coaxial direction;
a clamping surface movable in response to movement of the actuator and clamping against a surface of the clamping collar when in a clamping condition;
a hollow extension collar being at least 25 mm long in the coaxial direction; and
an elongated extension rod located within the extension collar for moving the clamping surface, the extension collar and rod being removable from the clamp body and clamping collar.

9. The system of claim 8, wherein the actuator includes a pneumatically powered piston and a clamping finger includes a cam, the clamping surface and a hook-shaped section.

10. The system of claim 8, further comprising:
a pneumatically driven piston;
the clamping surface movable from a retracted to a clamping position in response to movement of the piston; and
the locating pin having a substantially tapered shape adapted to receive a hole of a removable workpiece.

11. The system of claim 8, wherein:
the elongated extension rod couples the actuator to the clamping surface;
the hollow extension collar is removably attached to the body; and
the actuator advances and retracts substantially perpendicular to a receiving direction of the locating pin and an elongated direction of the extension rod.

12. The system of claim 8, wherein the clamp body has a substantially polyhedron shape with six major external surfaces, holes extending through at least four of the surfaces for allowing at least two of the major surfaces to be positioned against a face wall of a trolley mount, further comprising elongated fasteners extending through the holes in the body.

13. The system of claim 8, further comprising:
a right-angle riser mounted to a moving assembly line trolley;
the clamp body being mounted to the riser; and
the clamping surface operably securing an automotive vehicle panel.

14. A clamp system comprising:
a clamp body;
an actuator at least partially movable within the body;
a clamping collar externally coupled to the body;
a tapered locating pin externally mounted to a distal end of the clamping collar and projecting in a coaxial direction;
a clamping finger movable into and out of the locating pin in response to movement of the actuator and clamping an automotive vehicle panel against a surface of the clamping collar when in a clamping condition;
a hollow extension collar being at least 10 mm long in the coaxial direction; and
a riser mounted to a moving assembly line trolley, and the clamp body being mounted to the riser.

15. The system of claim 14, further comprising an extension rod located within the extension collar for moving the finger, the extension rod comprising a bore coupled to a cam follower adjacent a first end, and a pin adjacent a second and opposite end for attachment to a shaft upon which the finger is located.

16. The system of claim 15, wherein the shaft comprises a camming surface and a hooked section.

17. The system of claim 14, wherein:
the hollow extension collar is removably attached to the clamp body; and
the actuator advances and retracts substantially perpendicular to a receiving direction of the locating pin.

18. The system of claim 14, wherein the clamp body has a substantially polyhedron shape with six major external surfaces, holes extending through at least four of the surfaces for allowing at least two of the major surfaces to be positioned against a wall of the riser, further comprising elongated fasteners extending through the holes in the body.

19. The system of claim 14, wherein the extension collar and an extension rod are adapted to be retrofitted between the clamp body and the clamping collar in order to extend a clamp-to-body distance.

20. The system of claim 14, wherein the clamp body includes at least four flat side walls, the clamping collar has a cylindrical side wall and the extension collar has a cylindrical side wall.

* * * * *